(12) United States Patent
Roberts

(10) Patent No.: US 6,831,888 B2
(45) Date of Patent: Dec. 14, 2004

(54) DISK CARTRIDGE WITH SINGLE SHUTTER HELD IN MULTIPLE OPEN POSITIONS

(75) Inventor: Gregory D. Roberts, Breckenridge, MN (US)

(73) Assignee: Imation Corp., Oakdale, MN (US)

( * ) Notice: Subject to any disclaimer, the term of this patent is extended or adjusted under 35 U.S.C. 154(b) by 273 days.

(21) Appl. No.: 10/112,549

(22) Filed: Mar. 28, 2002

(65) Prior Publication Data

US 2003/0185146 A1 Oct. 2, 2003

(51) Int. Cl.$^7$ .............................................. G11B 23/03
(52) U.S. Cl. ...................................................... 369/291
(58) Field of Search ........................................ 369/291

(56) References Cited

U.S. PATENT DOCUMENTS

| | | | | |
|---|---|---|---|---|
| 6,052,359 A | * | 4/2000 | Fujiura | 369/291 |
| 6,094,326 A | * | 7/2000 | Ikebe et al. | 360/133 |
| 6,118,757 A | | 9/2000 | Olsen et al. | |
| 6,396,800 B1 | * | 5/2002 | Yamashita | 369/291 |

FOREIGN PATENT DOCUMENTS

| | | |
|---|---|---|
| EP | 0 657 882 A2 | 6/1995 |
| WO | WO 00/72312 A2 | 11/2000 |
| WO | WO 01/80243 A2 | 10/2001 |
| WO | WO 01/80244 A2 | 10/2001 |

* cited by examiner

Primary Examiner—William Klimowicz
Assistant Examiner—Mark Blouin
(74) Attorney, Agent, or Firm—Eric D. Levinson (57) ABSTRACT

A cartridge assembly for a data storage disk includes a housing for containing the data storage disk inside the housing. The housing defines a plurality of openings for exposing a portion of the data storage disk. An external shutter is supported by the housing on the outside of the housing. The external shutter is moveable between a closed position and first and second open positions disposed on opposite sides of the closed position. According to another aspect, a cartridge assembly for a data storage disk includes a casing and a moveable member disposed to slide on the casing. At least one of the casing and the moveable member includes protrusions or equivalent structure for holding the moveable member in a closed position and in one or more open positions. A method of making a ready-to-use data storage disk cartridge assembly provides other advantages.

21 Claims, 5 Drawing Sheets

DISK CARTRIDGE WITH SINGLE SHUTTER HELD IN MULTIPLE OPEN POSITIONS

BACKGROUND OF THE INVENTION

Embodiments of the invention relate to a cartridge assembly for a data storage disk, and methods of making a cartridge assembly for a data storage disk. More particularly, embodiments of the invention relate to such cartridge assemblies having a housing and a movable shutter for uncovering an opening in the housing to expose at least a portion of the data storage disk.

Removable storage media have become universally accepted for storing data. Desktop, laptop and handheld computing devices, digital cameras, digital music players, and other electronic devices commonly use such media to read, store and/or transfer data. Advances in technology are greatly reducing the size of such media while at the same time increasing their storage capacity.

One known type of digital storage media holds up to 500 MB of data, with higher capacities contemplated, but is merely the size of a small coin. Universal media format promulgated by DataPlay, Inc. of Boulder, Colo. is designed to play and record multiple types of content on a single disk: music, images, books, games, computer files, and cellular phone numbers, to name a few examples. Such media enables access to all forms of digital content across all digital devices and platforms, including music, images, documents, software, games, video, and more. One 500 MB digital media can hold more than 11 hours of music downloads or five complete pre-recorded albums of CD-quality music, hundreds of high-resolution photographs, or dozens of games, for example. Any properly-enabled computer or other device can read and play back such content.

Figure 1:
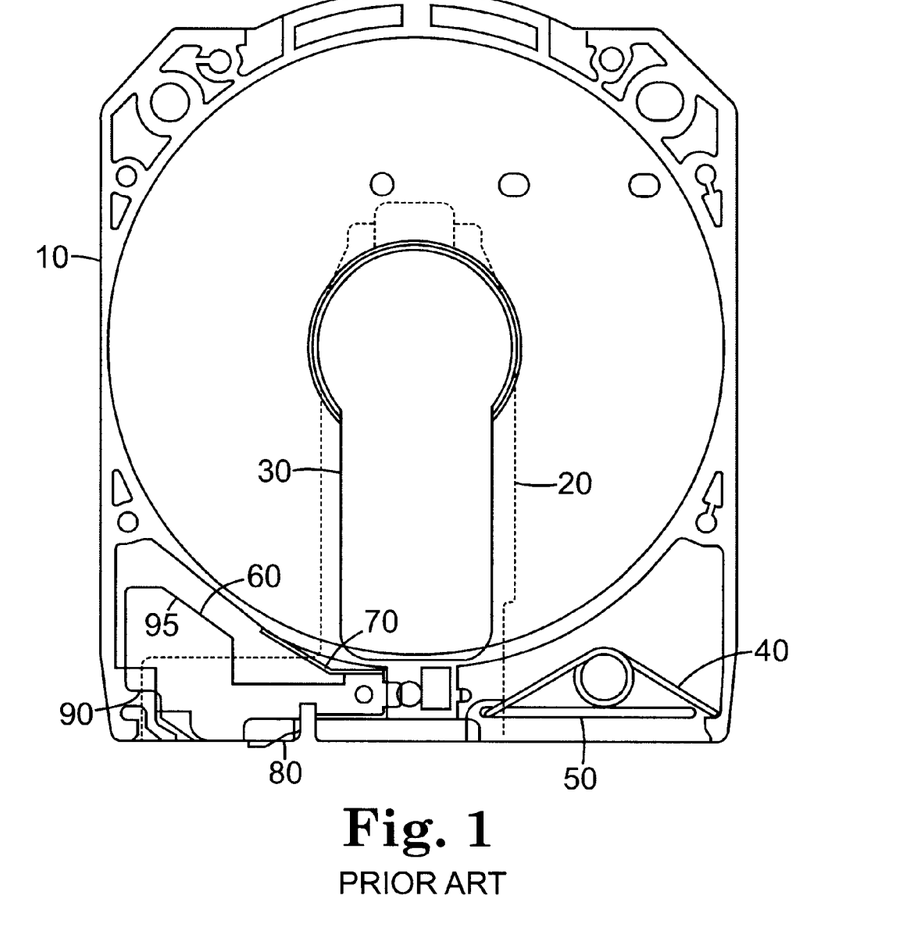
FIG. 1 is an inside plan view of a conventional data cartridge housing member.

FIG. 1 is an inside plan view of conventional data cartridge housing member 10. Housing member 10 supports shutter 20 (shown in dashed lines because it is on the outside of housing member 10) for side-to-side movement. Shutter 20 alternately covers and uncovers opening 30 in housing member 10 for exposure of an optical disk (not shown) to the head of an optical drive (not shown). Spring 40 slides in spring guide slot 50 to accommodate opening movement of shutter 20 and to urge shutter 20 toward a closed position upon removal of the data cartridge from the drive. Locking arm 60 includes spring member 70, a locking nub to be aligned with a corresponding slot in shutter 20, concave cam surface 80 to aid shutter 20 in sliding over the locking nub, and stop edges 90, 95. Two housing members 10 and associated components must be assembled together with an optical disk to create an operational disk cartridge. Although providing certain advantages, this known data storage disk cartridge also provides a number of operational and manufacturing complexities.

Figure 2:
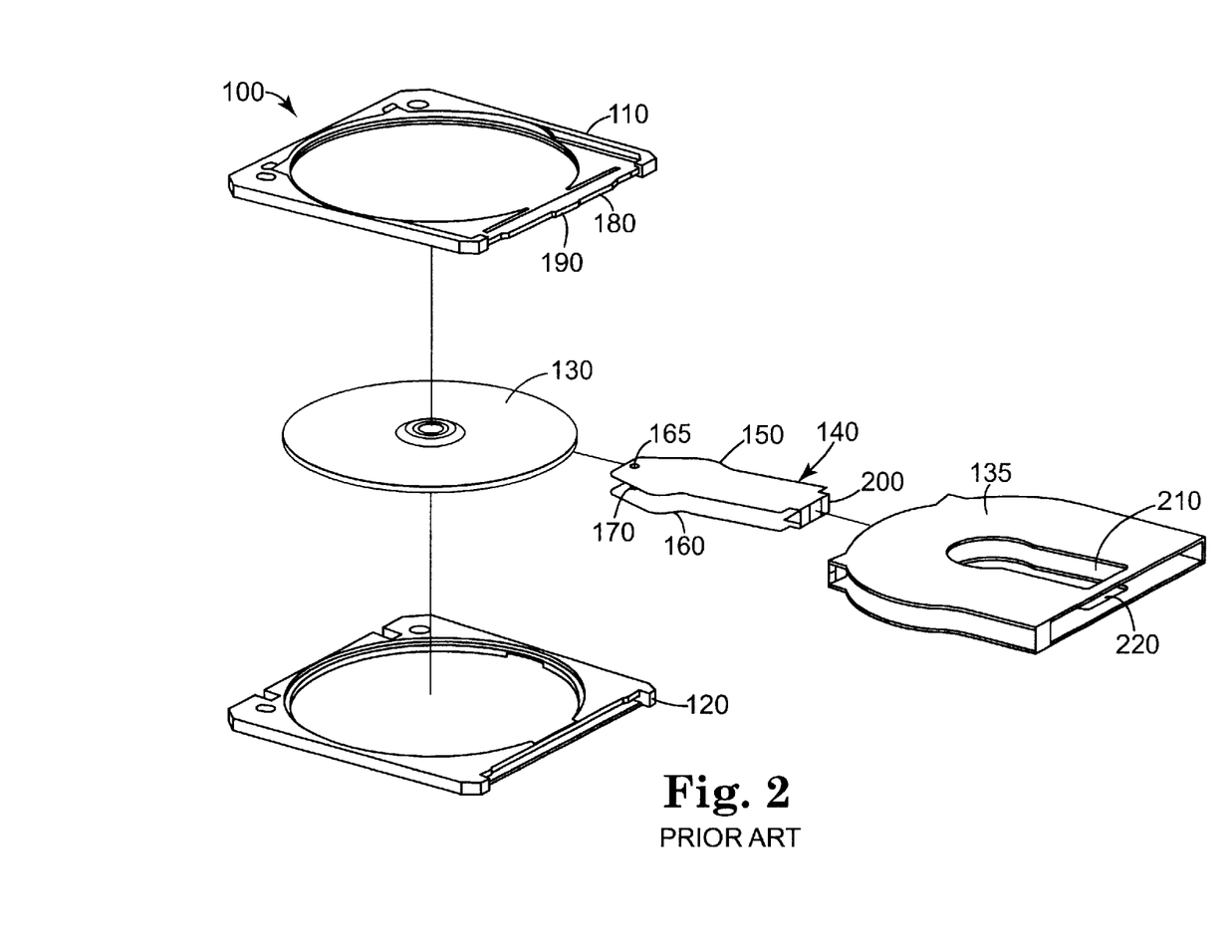
FIG. 2 is an exploded, perspective view of a conventional data cartridge assembly.

FIG. 2 is an exploded view of conventional data cartridge assembly 100. Cartridge assembly 100 includes housing members 110, 120 for enclosing optical disk 130. Cartridge assembly 100 also includes a unitary, metal cover 135 that also encloses optical disk 130 within housing members 110, 120. Internal shutter 140 includes two arms 150, 160 that are sprung outwardly and that include respective outwardly facing dimples 165, 170. Dimples 165, 170 contact an adjacent interior wall of cover 135. As internal shutter 140 moves laterally inside cartridge assembly 100, dimples 165, 170 contact and slide against the interior walls of cover 135. Elastic locking member 180 is secured by housing member 110. Locking member 180 is biased outwardly to cause locking projection 190 to engage rotary arm opening 200 in shutter 140 when shutter 140 is in a closed position. When cartridge assembly 100 is placed within an optical drive (not shown), shutter arm opening 200 is engaged by a rotary arm (not shown) to push locking projection 190 inwardly to release shutter 140 for lateral movement. When shutter 140 is in an open position, the optical head can access both sides of optical disk 130 through windows 210, 220 in cover 135. When cartridge assembly 100 is removed from the optical drive, the rotary arm of the drive returns shutter 140 to its closed position. Locking projection 190 returns into opening 200 to lock shutter 140 in a closed position.

Attention is directed to, e.g., World Intellectual Property Organization International Publication Nos. WO 01/80243 A2, published Oct. 25, 2001, WO 01/80244 A2, published Oct. 25, 2001, and WO 00/2312 A2, published Nov. 30, 2000, for example, for additional detail.

Although providing certain advantages, data cartridge assembly 100 creates very small internal clearances for optical disk 130. Shutter 140 is compressed within cover 135, which itself is disposed within housing members 110, 120. Contact with shutter 140, e.g., through windows 210, 220 when shutter 140 is in a closed position, can easily cause contact with optical disk 130 and result in potential damage. During use, frictional contact between dimples 165, 170 and cover 135 creates internal debris generation issues, as does the assembly process of inserting shutter 140 within cover 135. The overall shell structure of data cartridge assembly 100 also provides a number of operational and manufacturing complexities.

SUMMARY OF THE INVENTION

One aspect of the present invention relates to a cartridge assembly for a data storage disk, the cartridge assembly including a housing for containing the data storage disk. The housing defines a plurality of openings for exposing a portion of the data storage disk. The cartridge assembly further includes an external shutter supported by the housing outside the housing, the shutter being movable between a closed position for covering the openings defined by the housing, a first open position for uncovering the openings defined by the housing to expose the data storage disk, and a second open position for uncovering the openings defined by the housing to expose the data storage disk. The first open position and the second open position are disposed on opposite sides of the closed position. The housing includes a protrusion, according to an aspect of the invention, the protrusion being adapted to engage the external shutter and hold the external shutter in the closed position. The protrusion is further adapted to hold the external shutter in one of the first and second open positions. The housing defines a central aperture and defines a groove, according to one aspect, the groove being disposed on a side of the central aperture opposite the protrusion. The shutter includes a tab at least partially exposed to the outside of the assembly, the tab being disposed for movement within the groove. The protrusion is one of a plurality of protrusions disposed on opposite sides of the external shutter when the external shutter is in the closed position, the plurality of protrusions being adapted to contact opposite edges of the external shutter. The assembly is constructed such that the shutter is unbiased toward the closed position, according to one aspect, when the shutter is in either the first open position or the second open position. The shutter is self-biased inwardly into contact with the housing. According to another aspect, the housing defines a groove and the shutter includes a tab at least partially exposed to the outside of the assembly, the tab being disposed for movement within the groove. A keeper is disposed over the groove and over the tab for holding the tab within the groove. The keeper is generally centered on the housing.

According to another aspect of the invention, a cartridge assembly for a data storage disk includes a casing for holding the data storage disk, the casing defining a plurality of openings for exposing the data storage disk. The cartridge assembly also includes a movable member disposed to slide on a side of the casing opposite the data storage disk to cover and uncover the openings. At least one of the casing and the moveable member includes means for holding the moveable member, the means for holding being adapted to contact an edge of the moveable member to hold the moveable member in place over the openings. The means for holding is further adapted to contact an edge of the moveable member to hold the moveable member in place away from the openings free of external force acting on the assembly. The casing defines a first generally flat surface and the moveable member defines a second generally flat surface, according to one aspect of the invention, the first and second generally flat surfaces being disposed to face each other. The means for holding includes a protrusion extending from one of the first and second generally flat surfaces into contact with the other of the first and second generally flat surfaces as the moveable member slides on the casing. The protrusion extends past the other of the first and second generally flat surfaces when the means for holding holds the moveable member in place over the openings and when the means for holding holds the moveable member in place away from the openings. The means for holding includes two generally identical protrusions, according to an aspect of the invention, and/or exactly eight generally identical protrusions. The moveable member is adapted to slide over and contact the means for holding when the moveable member slides to cover and uncover the openings.

According to another aspect of the invention, a method of making a ready-to-use data storage disk cartridge assembly includes providing a housing, the housing defining a central aperture and two grooves adjacent to the central aperture, the two grooves being disposed on opposite sides of the housing, disposing a data storage disk within the housing, disposing a one-piece shutter over the housing, the shutter including two arms extending on opposite sides of the housing, each arm having a tab disposed on an end thereof, inserting the two tabs into the respective two grooves, and covering the two grooves to generally prevent movement of the tabs out of the grooves and to form a ready-to-use data storage disk cartridge assembly. The shutter is moveable between a closed position, in which the shutter covers disk-access openings in the housing, and an open position, in which the shutter allows access to the disk through the openings. The method includes leaving the one-piece shutter unbiased toward the closed position, according to one aspect, and includes molding the housing to include a pair of protrusions, the pair of protrusions being disposed to contact opposite edges of the one-piece shutter. The method includes assembling only four separate parts to form the ready-to-use data storage disk cartridge assembly, according to an aspect of the invention.

Other features and aspects according to embodiments of the invention will be apparent from the remainder of this disclosure.

DETAILED DESCRIPTION OF PREFERRED EMBODIMENTS

FIGS. 3–7 illustrate a data cartridge embodiment according to the present invention. According to this embodiment, cartridge 250 includes housing 260 for holding information-containing media such as data storage disk 265. Housing 260 is composed of upper and lower housing members 270, 275, according to this embodiment, secured together in known fashion. Housing 260 alternatively can include a single housing member, or more than two members, if desired. Housing 260 also defines upper and lower openings 280, 285 in housing members 270, 275 for exposing at least a portion of data storage disk 265 to, e.g., an optical head (not shown) or other component of an optical drive or other drive or device capable of reading and/or writing data to/from data storage disk 265. As will be appreciated by those of ordinary skill, data storage disk 265 can be used for various types of data storage, including data for computing devices such as personal computers, laptop computers, desktop computers, personal digital assistants and handheld devices, audio data, for example music-data storage for MP3 players, photographic or video data for digital still cameras or digital video cameras, voice data, software, personal data, and other types of data and information.

Figure 5:
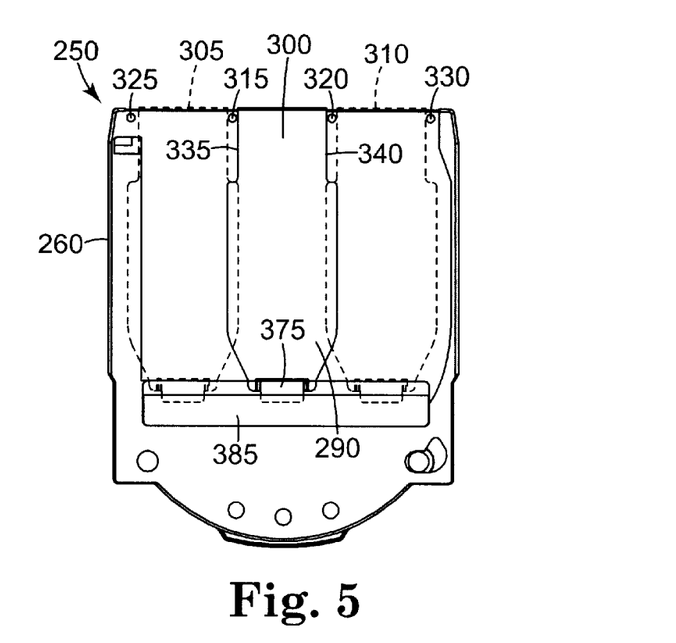
FIG. 5 is a plan view of the FIG. 3 data storage disk cartridge.
Figure 6:
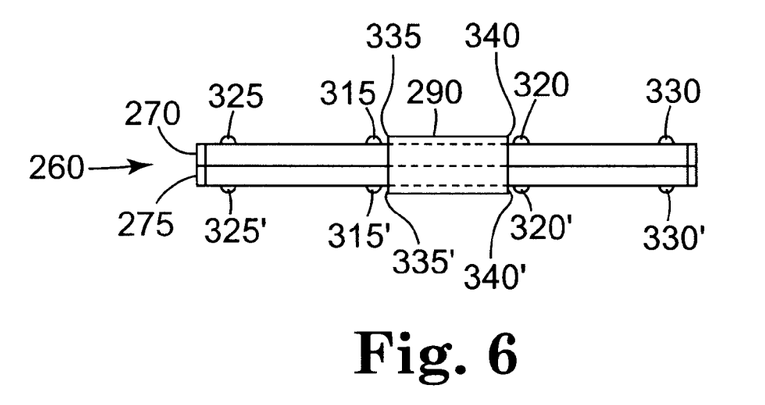
FIG. 6 is an end view of the FIG. 3 data storage disk cartridge.
Figure 7:
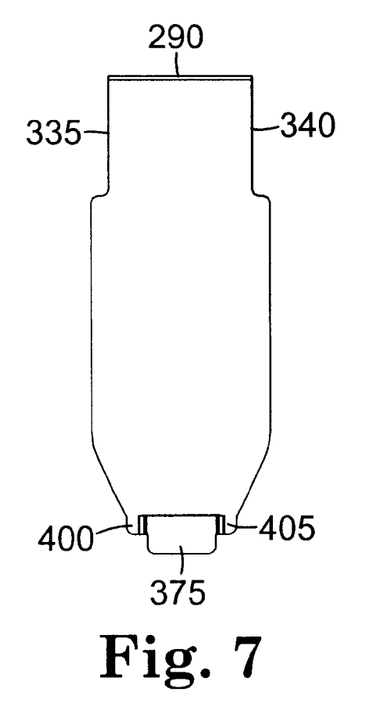
FIG. 7 is a plan view of a shutter according to an embodiment of the invention.

Housing 260 supports external shutter 290 on one or more outside surfaces of housing 260, or otherwise outside the interior of housing 260. Shutter 290 is moveable between closed position 300, for covering openings 280, 285 defined on opposite sides of housing 260, and first and second open positions 305, 310 (FIG. 5) for uncovering openings 280, 285 in housing 260 to expose data storage disk 265. As shown in FIG. 5, first open position 305 and second open position 310 are disposed on opposite sides of closed position 300. Shutter 290 is a moveable member disposed to slide on housing 260. Housing 260 also can be called a casing, according to aspects of the invention.

Housing 260 defines a plurality of protrusions 315, 320, 325, 330. The protrusions are generally identical to each other and can be molded as one piece with housing 260. A plurality of protrusions are disposed on opposite sides of cartridge 250, namely on upper and lower housing members 270, 275, for example. More specifically, housing 260 can define eight generally identical protrusions, four of which (315, 320, 325, 330) are disposed on upper housing member 270, as shown in, e.g., FIGS. 3-6, and a corresponding four of which 315', 320', 325', 330' (FIG. 6; not necessarily to scale) are disposed on lower housing 275. In that regard, the lower side of cartridge 250 is generally identical to the upper side of cartridge 250 as illustrated in, e.g., FIG. 4; therefore, to simplify the disclosure, a separate illustration showing the entire lower side of cartridge 250 is not provided herein.

According to aspects of the invention, protrusions 315, 320 engage external shutter 290 and hold external shutter 290 in closed position 300. Additionally, protrusion 315 is adapted to hold external shutter 290 in first open position 305, and protrusion 320 is adapted to hold external shutter 290 in second open position 310. More specifically, protrusions 315, 320 are adapted to contact edges 335, 340 of shutter 290. When shutter 290 is in first open position 305, protrusions 315, 325 contact edges 340, 335, respectively, to hold shutter 290 in first open position 305. When shutter 290 is in second open position 310, protrusions 320, 330 contact edges 335, 340, respectively, to hold shutter 290 in second open position 310. Those of ordinary skill will appreciate that protrusions 315', 320', 325' and 330' interact similarly with edges 335', 340' on the opposite side of housing 260.

According to aspects of the invention, no springs or other biasing members are engaged with shutter 290. Accordingly, shutter 290 is unbiased toward closed position 300 when shutter 290 is in either first open position 305 or second open position 310. Additionally, protrusions 315, 320, 325, 330 are adapted to hold shutter 290 in place away from openings 280, 285 free of external force acting on cartridge 250. With conventional disk cartridges, on the other hand, for example those of the type shown in FIG. 1, an external force has to act on the cartridge to hold shutter 20 in an open position against the biasing force of spring 40. Once the external force is removed, spring 40 biases shutter 20 back to the closed position illustrated in FIG. 1. Aspects of the invention hold shutter 290 in place away from openings 280, 285 free of external force acting on cartridge 250.

Figure 4:
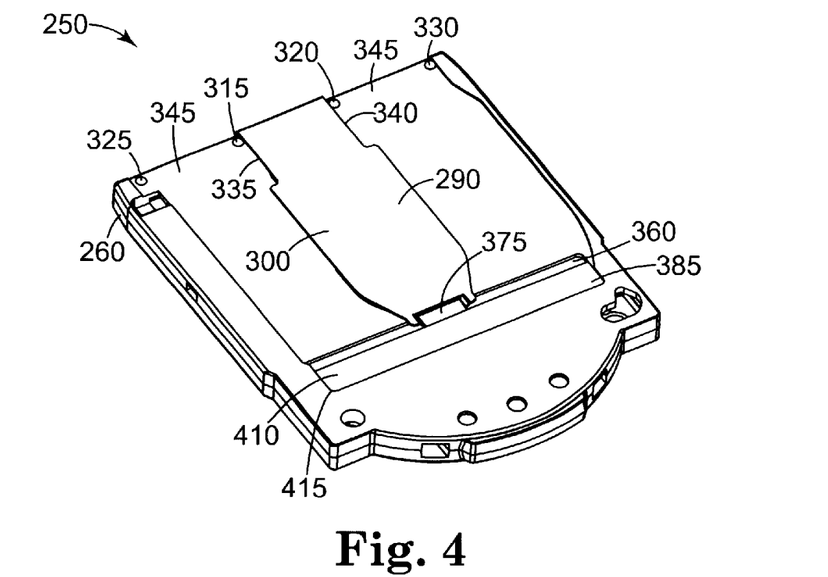
FIG. 4 is a perspective view of the FIG. 3 data storage disk cartridge.
Figure 8:
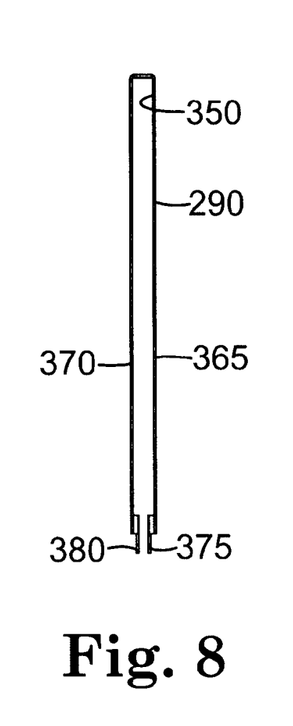
FIG. 8 is a side view of the FIG. 7 shutter.

According to other aspects of the invention, casing or housing 260 defines a first generally flat surface 345 and shutter 290 defines a second generally flat surface 350, illustrated in, e.g., FIGS. 4 and 8. First surface 345 and second surface 350 are disposed to face each other in an assembled cartridge. As shutter 290 slides back and forth between closed position 300 and either first or second open positions 305, 310, protrusions 315 or 320 extend from first surface 345 into contact with second surface 350. In other words, shutter 290 is adapted to slide over and contact protrusions 315, 320 when shutter 290 slides to cover and uncover openings 280, 285. Although some debris generation may be expected from such contact, any such debris is created external to cartridge 250 instead of within it. Such debris, therefore, is less likely to contaminate disk 265 or associated components. When protrusions 315, 320 hold shutter 290 in place over openings 280, 285, as well as when protrusions 315, 325 and 320, 330, respectively, hold shutter 290 in first and second open positions 305, 310, protrusions 315, 320, 325, 330 extend past generally flat surface 350, causing contact with edges 335, 340 of shutter 290.

According to aspects of the invention, shutter 290 is self-biased inwardly into contact with housing 260. Additionally, housing 260 defines groove 360. Shutter 290 is a one-piece shutter including two arms 365, 370 extending on opposite sides of housing 260. Each arm 365, 370 includes a respective tab 375, 380. Tabs 375, 380 are disposed for movement within groove 360 and within a corresponding groove disposed on the lower side of cartridge 250. More specifically, tabs 375, 380 move within their respective grooves as shutter 290 moves between closed position 300 and the first and second open positions 305, 310. As shown in e.g. FIG. 5, tab 375 is partially exposed to the outside of cartridge 250 and is partially covered. Keeper 385 is disposed over groove 360 and over tab 375 for holding tab 375 within groove 360. Keeper 385 also can include a recess on an inner side thereof to help accommodate tab 375 when it is disposed in groove 360. As shown, keeper 385 is generally centered on housing 260. A corresponding groove and corresponding keeper are associated with lower housing member 275. Groove 360 and its counterpart on lower housing member 275 are disposed adjacent central aperture 395 of cartridge 250.

Figure 3:
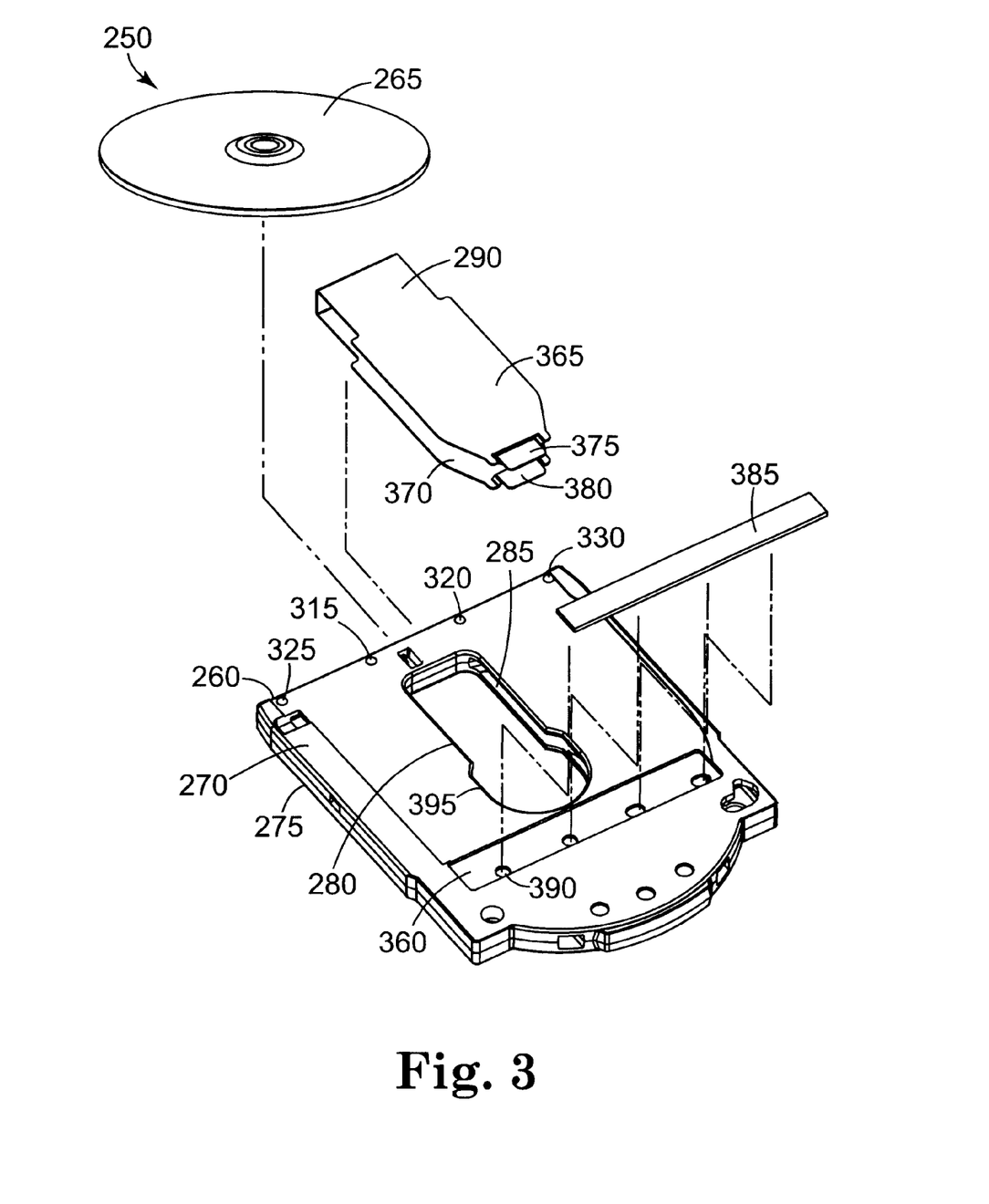
FIG. 3 is an exploded, perspective view of a data storage disk cartridge according to an embodiment of the invention.

As shown in, e.g., FIG. 3, one embodiment of keeper 385 is inserted into holes 390 disposed in the bottom surface of groove 360. To that end, keeper 385 can include projecting legs for insertion into holes 390. According to alternative aspects of the invention, keeper 385 can be molded or otherwise formed as one piece with upper housing member 270, as can another keeper associated with lower housing member 275. With such embodiments, only four separate parts need be used to assemble a ready-to-use cartridge 250 according to the invention: disk 265 or other information-containing medium, shutter 290, and first and second housing members 270, 275.

According to aspects of the invention, a method of making ready-to-use data storage disk cartridge or cartridge assembly 250 includes providing housing 260, the housing defining central aperture 395 and two grooves 360 adjacent central aperture 395, e.g., one on housing member 270 and one on housing member 275. The two grooves 360 thus are disposed on opposite sides of housing 260. The method further includes disposing data storage disk 265 within housing 260, disposing one-piece shutter 290 over housing 260, one-piece shutter 290 including two arms 365, 370 extending on opposite sides of housing 260, each arm having a tab 375, 380 on an end thereof. Tabs 375, 380 are inserted into their respective grooves 360, and grooves 360 are then covered by keeper 385 to generally prevent movement of tabs 375, 380 out of grooves 360 and to form a disk cartridge assembly that is ready to use, e.g., ready to be inserted into an optical drive or other drive for formatting, data or information transfer, or other function. According to aspects of the invention, shutter 290 is unbiased toward, e.g., closed position 300.

As referenced previously, housing 260 can be molded to include one or more of protrusions 315, 320, 325, 330. Protrusion pair 325, 315, protrusion pair 315, 320, and/or protrusion pair 320, 330 are disposed to contact opposite edges 335, 340 of shutter 290 depending on its position. According to aspects of the invention, the method of making disk cartridge assembly 250 includes assembling only four separate parts to form a ready-to-use data storage disk cartridge assembly: optical or other disk 265, one-piece shutter 290, and first and second housing members 270, 275. In the case of a four-piece construction, keeper 385 and its corresponding lower counterpart are molded or otherwise formed as one piece with respective housing members 270, 275, and bent or otherwise moved into place over groove 360 at the appropriate point in the assembly process.

Embodiments of the invention can significantly reduce costs associated with making data storage disk cartridge assemblies. Spring 40 and locking arms 60 (FIG. 1) are eliminated. Shutter 290 is a single piece instead of two separate pieces. Five components thus are eliminated, and consequent assembly equipment and processes also are eliminated. For example, spring insertion, shutter lock metal stamping, flipping the cartridge assembly over for separate shutter insertion, and corresponding testing stations all are eliminated. Two separate keepers are also eliminated, according to aspects of the invention. Improved internal clearance is created for optical or other data storage disk 265 or other media, relative to, e.g., the conventional disk shown in FIG. 2. Debris generation, if any, is external, instead of internal. The number of parts is reduced. Overall shell structure is simplified. Embodiments of the invention thus reduce cycle times, reduce costs, and provide other advantages. Efficiencies and quality are improved.

According to alternative aspects of the invention, other means for holding can be provided, instead of or in addition to the previously described protrusions. For example, holes, pockets or depressions can be provided in surface 350 of shutter 290 for accommodating protrusions extending from the housing. Protrusions can be provided on surface 350, instead of or in addition to the housing protrusions previously described, and optionally with corresponding depressions or pockets formed in housing 260. Some protrusions, e.g., protrusions 325, 325', 330 and 330', can be formed higher or taller than the remaining protrusions. Other variations in structure will be apparent to those of ordinary skill upon reading this disclosure.

Those of ordinary skill also will appreciate that cartridge 250, housing 260, shutter 290 and the other components described herein can be of various selected dimensions. For example, a width of cartridge 250 can be, e.g., less than about 40 mm, and can range, e.g., from about 30 mm to about 37 mm. The length of cartridge 250 can be, e.g., less than about 42 mm, and can range, e.g., from about 30 mm to about 40 mm. The thickness of cartridge 250 can be, e.g., less than about 5 mm, and can range, e.g., from about 1 mm to about 3 mm. The entire cartridge 250 can have a mass of, e.g., less than about 7 gm, or, e.g., less than about 5 gm. Other possible dimensions according to the invention will be apparent to those of ordinary skill upon reading this disclosure. Additionally, those of ordinary skill will appreciate that the term "housing" can be interpreted to include a housing constructed of multiple housing members.

Housing members 270, 275, as well as keeper 385, can be made by injection molding of a thermoplastic material, for example, although other manufacturing techniques and other materials also are contemplated. For example, machining, stamping, punching or the like are contemplated to create each of the housing members 270, 275, and keeper 385, and materials such as aluminum or other metals, resins, ceramics, fiberglass, etc., also can be used. One or both of housing members 270, 275 can be formed of a translucent or transparent material, for example, a polycarbonate material, to better enable the use of ultraviolet-curable adhesives. Such adhesives can be cured by ultraviolet light at areas of direct exposure thereto, e.g., through the translucent or transparent material of housing members 270 and/or 275, to aid in securing housing members 270, 275 together. Shutter keeper 385 also can be constructed of a translucent or transparent material, to enable the use of ultraviolet-curable adhesives for use in securing keeper 385 in a closed position. Alternatively, adhesive can be eliminated in favor of, e.g., ultrasonic welding.

Other structural details according to embodiments of the invention will be apparent from the figures. For example, shutter 290 defines two projecting end portions 400, 405 for bordering tab 375. Corresponding end portions border tab 380. As also will be apparent, upper surfaces 410 of keeper 385, as viewed in, e.g., FIG. 4, can lie flush with edge 415 of groove 360 when keeper 385 is in a closed position, such that housing member 270 defines a generally planar upper surface and/or a generally planar continuous surface including an upper portion of keeper 385. As also will be appreciated, tabs 375, 380 lie below or out of the plane of end portions 400, 405 and/or the remainder of shutter 290. Shutter 290 in the illustrated embodiments extends past central aperture 395 of housing 260 such that groove 360 is disposed on an opposite side of aperture 395 from the protrusions. Alternatively, shutter 290 can stop short of central aperture 395, such that groove 360 is disposed on the same side of aperture 395 as the protrusions.

Although the present invention has been described with respect to certain embodiments, those skilled in the art will recognize that changes can be made in form and detail without departing from the spirit and scope of the invention. For example, a wide variety of data storage devices can be used according to the invention. Embodiments of the invention disclosed with respect to one housing member or side of cartridge 250, for example, housing member 270, are also equally applicable to the other housing member or side of cartridge 250, e.g., housing member 275, or to a one-piece housing. The term "assembly" should be understood to refer to the entire data cartridge or merely a portion of the data cartridge, for example, a portion of the data cartridge supported by or including just one of the two illustrated housing members. The term "to cover" should be understood to include entirely covering a structure or only partially covering it. Finally, it should be understood that directional terminology, such as upper, lower, left, right, above, and below, is used for purposes of illustration and description only, and is not intended necessarily to be limiting. Other modifications and changes will be apparent to those of ordinary skill.

What is claimed is:

1. A cartridge assembly for a data storage disk, the cartridge assembly comprising:
    a housing for containing the data storage disk, the housing defining a plurality of openings for exposing a portion of the data storage disk; and
    an external shutter supported by the housing outside the housing, the abutter being movable between a closed position for covering the openings defined by the housing, a first open position for uncovering the openings defined by the housing to expose the data storage disk, and a second open position for uncovering the openings defined by the housing to expose die data storage disk, the first open position and the second open position being disposed on opposite sides of the closed position: wherein the housing comprises a protrusion, the protrusion being fixed with respect to the remainder of the housing and being adapted to engage the external shutter and hold the external shutter in the closed position.

2. The assembly of claim 1, wherein the protrusion is further adapted to hold the external shutter in one of the first and second open positions.

3. The assembly of claim 2, wherein the housing defines a central aperture and defines a groove, the groove being disposed on a side of the central aperture opposite the protrusion; further wherein the shutter comprises a tab at least partially exposed to the outside of the assembly, the tab being disposed for movement within the groove.

4. The assembly of claim 2, wherein the protrusion is one of a plurality of protrusions disposed on opposite sides of the external shutter when the external shutter is in the closed position, the plurality of protrusions being adapted to contact opposite edges of the external shutter.

5. The assembly of claim 1, constructed such that the shutter is unbiased toward the closed position when the shutter is in either the first open position or the second open position.

6. The assembly of claim 1, wherein the shutter is self-biased inwardly into contact with the housing.

7. The assembly of claim 1, wherein the housing defines a groove and the shutter comprises a tab at least partially exposed to the outside of the assembly, the tab being disposed for movement within the groove.

8. The assembly of claim 7, further comprising a keeper disposed over the groove and over the tab for holding the tab within the groove.

9. The assembly of claim 8, wherein the keeper is generally centered on the housing.

10. The assembly of claim 1, wherein the protrusion is adapted to engage an outside edge of the external shutter to hold the external shutter in the closed position; further wherein the protrusion is adapted to engage an opposite outside edge of the external shutter to hold the external shutter in one of the first and second open positions.

11. A cartridge assembly for a data storage disk, the cartridge assembly comprising:
 a casing for holding the data storage disk, the casing defining a plurality of openings for exposing the data storage disk; and
 a moveable member disposed to slide on a side of the casing opposite the data storage disk to cover and uncover the openings;
 wherein at least one of the casing and the moveable member comprises means for holding the moveable member, the means for holding being adapted to contact an edge of the moveable member to hold the moveable member in place over the openings, the means for holding further being adapted to contact an edge of the moveable member to hold the moveable member in place away from the openings free of external force acting on the assembly.

12. The assembly of claim 1, wherein the casing defines a first generally flat surface and the moveable member defines a second generally flat surface, the first and second generally flat surfaces being disposed to face each other, further wherein the means for holding comprises a protrusion extending from one of the first and second generally flat surfaces into contact with the other of the first and second generally flat surfaces as the moveable member slides on the casing.

13. The assembly of claim 12, wherein the protrusion extends past the other of the first and second generally flat surfaces when the means for holding holds the moveable member in place over the openings and when die means for holding holds the moveable member in place away from the openings.

14. The assembly of claim 13, wherein the means for holding comprises two generally identical protrusions.

15. The assembly of claim 13, wherein the means for holding comprises exactly eight generally identical protrusions.

16. The assembly of claim 13, wherein die moveable member is adapted to slide over and contact the means for holding when the moveable member slides to cover and uncover the openings.

17. The assembly of claim 11, the assembly being constructed such that the movable member is unbiased toward covering the openings when the openings are uncovered by the movable member.

18. A cartridge assembly for a data storage disk, the cartridge assembly comprising:
 a housing for containing the data storage disk, the housing defining a plurality of openings for exposing a portion of the data storage disk; end
 an external shutter supported by die housing outside the housing, the shutter being movable between a closed position for covering the openings defined by the housing, a first open position for uncovering the openings defined by the housing to expose the data storage disk, and a second open position for uncovering the openings defined by the housing to expose the data storage disk, die first open position and the second open position being disposed on opposite sides of the closed position;
 wherein the assembly is constructed such that the shutter is unbiased toward the closed position when the shutter is in either the first open position or the second open position.

19. A method of making a ready-to-use data storage disk cartridge assembly, the method comprising:
 providing a housing, the housing defining a central aperture and two grooves adjacent the central aperture, the two grooves being disposed on opposite sides of the housing;
 disposing a data storage disk within the housing;
 disposing a one-piece shutter over the housing, die shutter including two arms extending on opposite sides of the housing, each sun having a tab disposed on an end thereof;
 inserting the two tabs into the respective two grooves; and
 covering the two grooves to generally prevent movement of the tabs out of the grooves and to form a ready-to-use data storage disk cartridge assembly, the shutter being movable between a closed position, in which the shutter covers disk-access openings in the housing, and an open position, in which the shutter allows access to die disk through the openings;
 wherein die method includes assembling only four separate parts to form the ready-to-use data storage disk cartridge assembly.

20. The method of claim 19, wherein the method comprises leaving the one-piece shutter and hold the external shutter in the closed position.

21. The method of claim 19, further comprising molding the housing to include a pair of protrusions, the pair of protrusions being disposed to contact opposite edges of the one-piece shutter.

* * * * *